United States Patent
Svoboda

(10) Patent No.: US 10,415,509 B2
(45) Date of Patent: Sep. 17, 2019

(54) COOLING SYSTEM FOR CRYOGENIC FUEL DELIVERY COMPONENTS

(71) Applicant: Electro-Motive Diesel, Inc., LaGrange, IL (US)

(72) Inventor: Kathryn C. Svoboda, Brookfield, IL (US)

(73) Assignee: Caterpillar Inc., Peoria, IL (US)

( * ) Notice: Subject to any disclaimer, the term of this patent is extended or adjusted under 35 U.S.C. 154(b) by 747 days.

(21) Appl. No.: 15/075,849

(22) Filed: Mar. 21, 2016

(65) Prior Publication Data

US 2017/0268463 A1 Sep. 21, 2017

(51) Int. Cl.
- *F17C 9/02* (2006.01)
- *F02M 21/02* (2006.01)
- *F02B 43/10* (2006.01)

(52) U.S. Cl.
CPC .... *F02M 21/0293* (2013.01); *F02M 21/0209* (2013.01); *F02M 21/0287* (2013.01); *F17C 9/02* (2013.01); *F02B 2043/103* (2013.01); *F17C 2201/0104* (2013.01); *F17C 2201/035* (2013.01); *F17C 2201/054* (2013.01); *F17C 2201/056* (2013.01); *F17C 2203/0391* (2013.01); *F17C 2203/0629* (2013.01); *F17C 2221/012* (2013.01); *F17C 2221/033* (2013.01); *F17C 2223/0161* (2013.01); *F17C 2223/033* (2013.01); *F17C 2223/043* (2013.01); *F17C 2223/046* (2013.01); *F17C 2225/0123* (2013.01); *F17C 2225/035* (2013.01); *F17C 2225/043* (2013.01); *F17C 2227/015* (2013.01);

(Continued)

(58) Field of Classification Search
CPC .......... F17C 9/02; F17C 2205/03; F17C 2205/0302; F17C 2205/0323; F17C 2205/0394; F17C 2205/0388; F17C 2225/03; F17C 2227/015; F17C 2227/0178; F17C 2265/066; F17C 2221/033; F02M 21/02; F02M 21/0293; F02M 21/0287; F02M 21/0209; B60Y 2400/434; F02D 19/0644
See application file for complete search history.

(56) References Cited

U.S. PATENT DOCUMENTS

| | | | |
|---|---|---|---|
| 4,570,578 A | 2/1986 | Peschka et al. | |
| 5,228,295 A * | 7/1993 | Gustafson | F02B 43/00 123/525 |

(Continued)

FOREIGN PATENT DOCUMENTS

JP    2007303605 A    11/2007

*Primary Examiner* — Frantz F Jules
*Assistant Examiner* — Erik Mendoza-Wilkenfel
(74) *Attorney, Agent, or Firm* — Miller, Matthias & Hull

(57) ABSTRACT

A method for precooling fuel delivery components of a machine having an engine fueled by a cryogenically-stored fuel is described. The fuel delivery components may be configured to operate at an operating temperature at or below a boiling point of the cryogenically-stored fuel. The method may comprise, in a vapor precooling mode, cooling the fuel delivery components to a temperature approaching the operating temperature with a vapor of the fuel taken from a reservoir cryogenically storing the fuel. The method may further comprise, in a liquid precooling mode, further cooling the fuel delivery components to the operating temperature with a liquid of the fuel taken from the reservoir.

20 Claims, 7 Drawing Sheets

(52) U.S. Cl.
CPC ........... *F17C 2227/0135* (2013.01); *F17C 2227/0302* (2013.01); *F17C 2227/0339* (2013.01); *F17C 2227/0393* (2013.01); *F17C 2250/032* (2013.01); *F17C 2250/0439* (2013.01); *F17C 2250/0631* (2013.01); *F17C 2260/056* (2013.01); *F17C 2265/066* (2013.01); *F17C 2270/0173* (2013.01); *Y02T 10/32* (2013.01)

(56) References Cited

U.S. PATENT DOCUMENTS

| | | | | |
|---|---|---|---|---|
| 5,566,712 | A | * | 10/1996 | White ............... B61C 5/00 137/587 |
| 5,775,281 | A | | 7/1998 | Smith |
| 9,016,264 | B2 | | 4/2015 | Stockner |
| 2014/0123916 | A1 | | 5/2014 | Coldren et al. |
| 2014/0245995 | A1 | | 9/2014 | Deliyski |
| 2015/0143821 | A1 | * | 5/2015 | Johnson ............... F17C 7/02 62/50.6 |

* cited by examiner

COOLING SYSTEM FOR CRYOGENIC FUEL DELIVERY COMPONENTS

TECHNICAL FIELD

The present disclosure generally relates to machines fueled by cryogenically-stored fuels and, more specifically, to cooling systems for the fuel delivery components of such machines.

BACKGROUND

As opposed to many fuels (e.g., gasoline and diesel) which are liquids at room temperature, cryogenic fuels are low boiling point fuels that require storage at very low temperatures to maintain a liquid state. Examples of cryogenic fuels include natural gas, with a boiling point of about −165° C., and hydrogen, with a boiling point of about −253° C. The general advantages of cryogenic fuels over other fuels may include higher energy density by volume and higher stability of the stored fuel. Natural gas advantages may include reduced greenhouse gas emissions and cost reductions. Due to advantages such as these, many vehicle and power generation applications are moving toward liquid natural gas as a fuel of choice.

Machines that are fueled by cryogenically-stored fuels may include a cryogenic reservoir to store the fuel as a liquid at low temperatures. Such machines may also include fuel delivery components (e.g., pumps, pipes, valves, pressure relief valves, filters, instrumentation, etc.) that may be designed to handle the fuel optimally as a liquid and at cryogenic temperatures below the boiling point of the fuel. However, at the beginning of a fueling cycle, such as when starting the machine from stop, the fuel delivery components may be at ambient temperature, or otherwise at a substantially warmer temperature than the cryogenic temperatures experienced during use. When the cold liquid fuel is initially introduced into the warm fuel delivery components at the beginning of a fueling cycle, heat may be introduced into the fuel due to cooling of the fuel delivery components by contact with the fuel. As a result, some of the liquid fuel may be vaporized leading to two-phase (gas/liquid) flow and undesirable fluid flow effects such as annular flow, slugs, plugs, and bubbles which may negatively impact the operation of the fuel delivery components by shock and vibration. Moreover, the vaporized fuel may be returned to the reservoir, thereby increasing the pressure of the reservoir due to a substantial phase change expansion ratio.

Many attempts have been made to prevent vaporization of liquid fuels in fuel delivery components. One example, as described in U.S. Pat. No. 5,228,295, uses liquid natural gas fuel to precool a pump, an eductor, and a meter prior to delivery of the liquid natural gas to a use device. While effective at achieving the function of precooling the system, the aforementioned system does not reduce or minimize liquid evaporation during precooling of the fuel delivery elements.

There is a need for improved systems for precooling fuel delivery components of machines fueled by cryogenically-stored fuels.

SUMMARY

In accordance with one aspect of the present disclosure, a machine is disclosed. The machine may comprise an engine fueled by a low boiling point fuel, and a reservoir cryogenically storing the low boiling point fuel as both a liquid and a vapor. The machine may further comprise a fuel delivery system configured to deliver the low boiling point fuel from the reservoir to the engine. The fuel delivery system may include a first set of fuel delivery components configured to operate at an operating temperature at or below a boiling point of the low boiling point fuel. The machine may further comprise a cooling system configured to precool some or all of the fuel delivery components to the operating temperature in a precooling mode. The precooling mode may include an initial vapor precooling mode in which some or all of the fuel delivery components are partially cooled with the vapor from the reservoir, and a subsequent liquid precooling mode in which the fuel delivery components are further cooled with the liquid from the reservoir to the operating temperature.

In accordance with another aspect of the present disclosure, a cooling system for precooling fuel delivery components of a machine fueled by a low boiling point fuel is disclosed. The fuel delivery components may be configured to operate at an operating temperature at or below the boiling point of the low boiling point fuel. The cooling system may comprise a reservoir containing a liquid and a vapor of the low boiling point fuel. The cooling system may further comprise a first fluid circuit configured to circulate the vapor from the reservoir between the fuel delivery components and the reservoir in a vapor precooling mode during which a temperature of the fuel delivery components is reduced to a temperature approaching the operating temperature. The cooling system may further comprise a second fluid circuit configured to circulate the liquid from the reservoir between the fuel delivery components and the reservoir in a subsequent liquid precooling mode during which the temperature of the fuel delivery components is further reduced to the operating temperature.

In accordance with another aspect of the present disclosure, a method for precooling fuel delivery components of a machine having an engine fueled by a cryogenically-stored fuel is disclosed. The fuel delivery components may be configured to operate at an operating temperature at or below the boiling point of the cryogenically-stored fuel. The method may comprise, in a vapor precooling mode, cooling the fuel delivery components to a temperature approaching the operating temperature with a vapor of the fuel taken from a reservoir cryogenically storing the fuel. The method may further comprise, in a liquid precooling mode, further cooling the fuel delivery components to the operating temperature with a liquid of the fuel taken from the reservoir.

These and other aspects and features of the present disclosure will be more readily understood when read in conjunction with the accompanying drawings.

DETAILED DESCRIPTION

Figure 1:
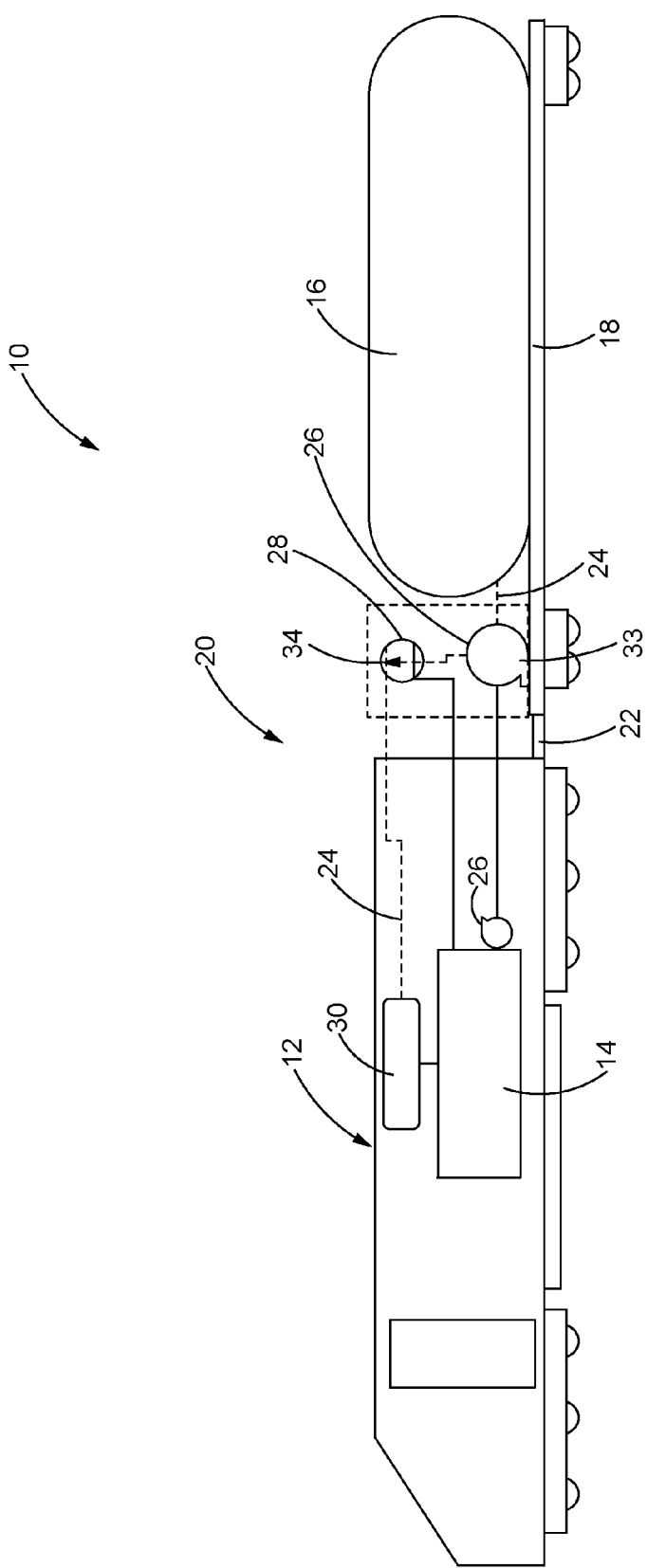
FIG. 1 is a schematic side view of a machine fueled by a cryogenically-stored fuel, constructed in accordance with the present disclosure.

Referring now to the drawings, and with specific reference to FIG. 1, a machine 10 fueled by a low boiling point fuel that is stored cryogenically is shown. As used herein, a "low boiling point fuel" is a fuel that has a boiling point of about −150° C. or below, examples of which may include, but are not limited to, natural gas, methane, hydrogen, as well as other high volatility fuels. In addition, as used herein, a "cryogenically-stored fuel" is a low boiling point fuel that is stored as a liquid at a temperature below its boiling point (i.e., about −150° C. or below). The machine 10 may be any type of machine that is at least partially powered by a low boiling point fuel that is stored cryogenically such as, but not limited to, a locomotive 12, a power generation station, a mining truck, an earth-moving machine, an off-road vehicle, or a marine vehicle.

The machine 10 may include an internal combustion engine 14 and a cryogenic reservoir 16, such as a tank, configured to store the low boiling fuel (hereinafter "the fuel") as a liquid at temperatures at or below the low boiling point of the fuel (i.e., about −150° C. or below). If the machine 10 is the locomotive 12, the reservoir 16 may be carried on a dedicated tender car 18 due, in part, to space constraints on the locomotive 12, although it may be located on board the locomotive 12 alternatively. The machine 10 may also include a fuel delivery system 20 configured to transport the fuel from the reservoir 16 to the engine 14 for combustion. If the machine 10 is the locomotive 12, the fuel delivery system 20 may be involved in transporting the fuel across a coupling 22 between the tender car 18 and the locomotive 12 and may include, among other components, various fluid lines or pipes 24, pumps 26, vaporizers 28, and an accumulator 30 for providing regulated fuel delivery to the engine 14.

Figure 2:
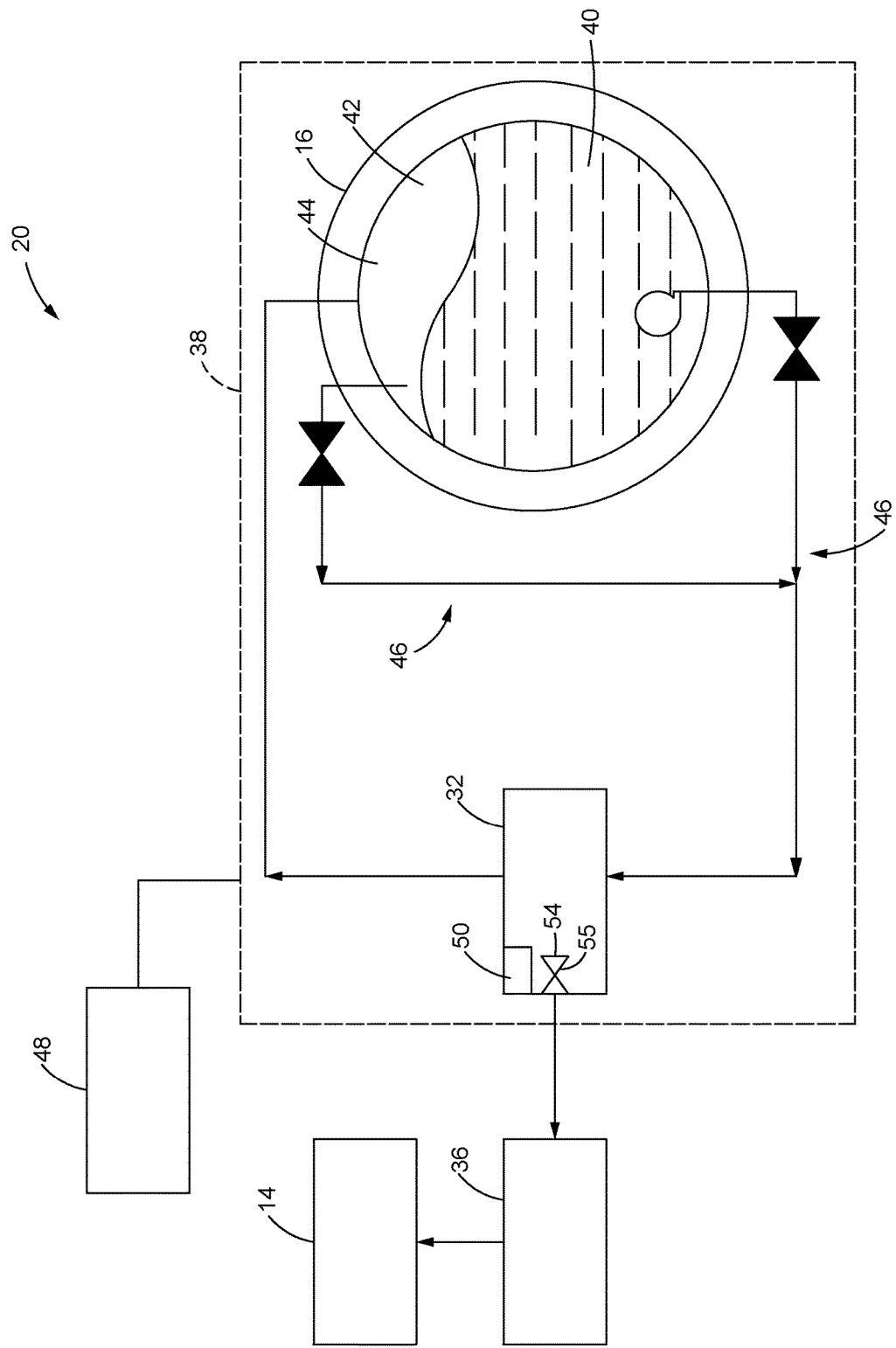
FIG. 2 is a schematic representation of a fuel delivery system of the machine including a cooling system for precooling fuel delivery components of the fuel delivery system, constructed in accordance with the present disclosure.

Turning now to FIG. 2, the fuel delivery system 20 is shown schematically. The fuel delivery system 20 may include a first set of cryogenic fuel delivery components 32, one or more of which may be designed to handle the fuel as a liquid at operating temperatures at or below the boiling point of the fuel (i.e., about −150° C. or below). The first set of fuel delivery components 32 may include a cryogenic pump 33 and a vaporizer 34 (see FIG. 1), as well as additional components such as valves, pressure relief valves, fluid lines or pipes, filters, and instrumentation. The first set of fuel delivery components 32 may be positioned on either or both of the tender car 18 and the locomotive 12, or other locations in the consist. Downstream of the first set of fuel system components 32 may be a second set of fuel delivery components 36 that are designed to handle the fuel as a vapor at warmer temperatures and higher pressures for delivery of the fuel to the engine 14 as a vapor. The second set of fuel delivery components 36 may be carried on either or both of the locomotive 12 and the tender car 18 and may include components such as the accumulator 30, valves, regulators, and various fluid lines or pipes. During engine fueling, the fuel may flow from the reservoir 16 to the first set of fuel delivery components 32, and from the first set of fuel delivery components 32 to the second set of fuel delivery components 36 before final delivery to the engine 14. In particular, the fuel may be (at least predominantly) in a liquid state when flowing through the first set of fuel delivery components 32, whereat the fuel may be in a vapor state when flowing through the second set of fuel delivery components 36. However, in an alternative arrangement, the fuel may be delivered to the engine 14 as a liquid.

The fuel delivery system 20 may also include a cooling system 38 configured to precool the some or all of the fuel delivery components 32 to the operating temperature (i.e., to a temperature at or below the boiling point of the fuel), as will be described in further detail below. The cooling system 38 may cool the fuel delivery components 32 from ambient temperature (or from a temperature substantially above the operating temperature) to the operating temperature before fueling of the engine occurs, such as when initially starting up the machine 10 from stop. Alternatively, the cooling system 38 may cool the fuel delivery components 32 at any time during the operation of the machine 10 when a temperature of the fuel delivery components 32 substantially exceeds the operating temperature. In either case, fueling of the engine 14 may be temporarily halted or delayed to allow cooling of the fuel delivery components 32 to the operating temperature. Precooling of the fuel delivery components 32 with the cooling system 38 may reduce vaporization of liquid fuel flowing through the fuel delivery components 32, thereby reducing potentially inefficient and/or harmful two-phase fluid flow effects in the fuel delivery system 20.

The cooling system 38 may generally include the cryogenic reservoir 16 containing a liquid 40 of the fuel, as well as a vapor 42 of the fuel in a vapor space 44 within the reservoir 16. The cryogenic reservoir 16 used for the cooling system 38 may be the same reservoir used for fueling the engine 14, or it may be a separate reservoir. The reservoir 16 may have an insulated construction, including, but not limited to, a vacuum-insulated double walled construction, capable of reducing heat ingress to the fuel in order to maintain the liquid state of the fuel. The cooling system 38 may also include fluid circuits 46 configured to circulate the fuel between the reservoir 16 and the fuel delivery components 32 during cooling (see further details below).

An electronic control unit (ECU) 48 may be in electrical communication with the fuel delivery system 20, and it may control the operation of the cooling system 38 according to the temperature of the fuel delivery components 32. In particular, one or more temperature sensors 50 associated with one or more of the fuel delivery components 32 may transmit signals indicating a temperature of one or more of the fuel delivery components 32 to the ECU 48, and the ECU 48 may respond by activating or deactivating the cooling system 38 accordingly. If the temperature of one or more of the fuel delivery components 32 substantially exceeds the operating temperature, the ECU 48 may initiate a precooling mode 52 (see FIGS. 3-4) in which the cooling system 38 may precool the fuel delivery components 32 to the operating temperature. In addition, the ECU 48 may temporarily suspend or delay fueling of the engine 14 until precooling is complete. One or more flow-regulating devices 54, such as one or more valves 55, associated with one or more of the fuel delivery components 32 may prevent the flow of the fuel to the downstream fuel delivery components 36 and the engine 14 during the precooling mode 52.

Figure 3:
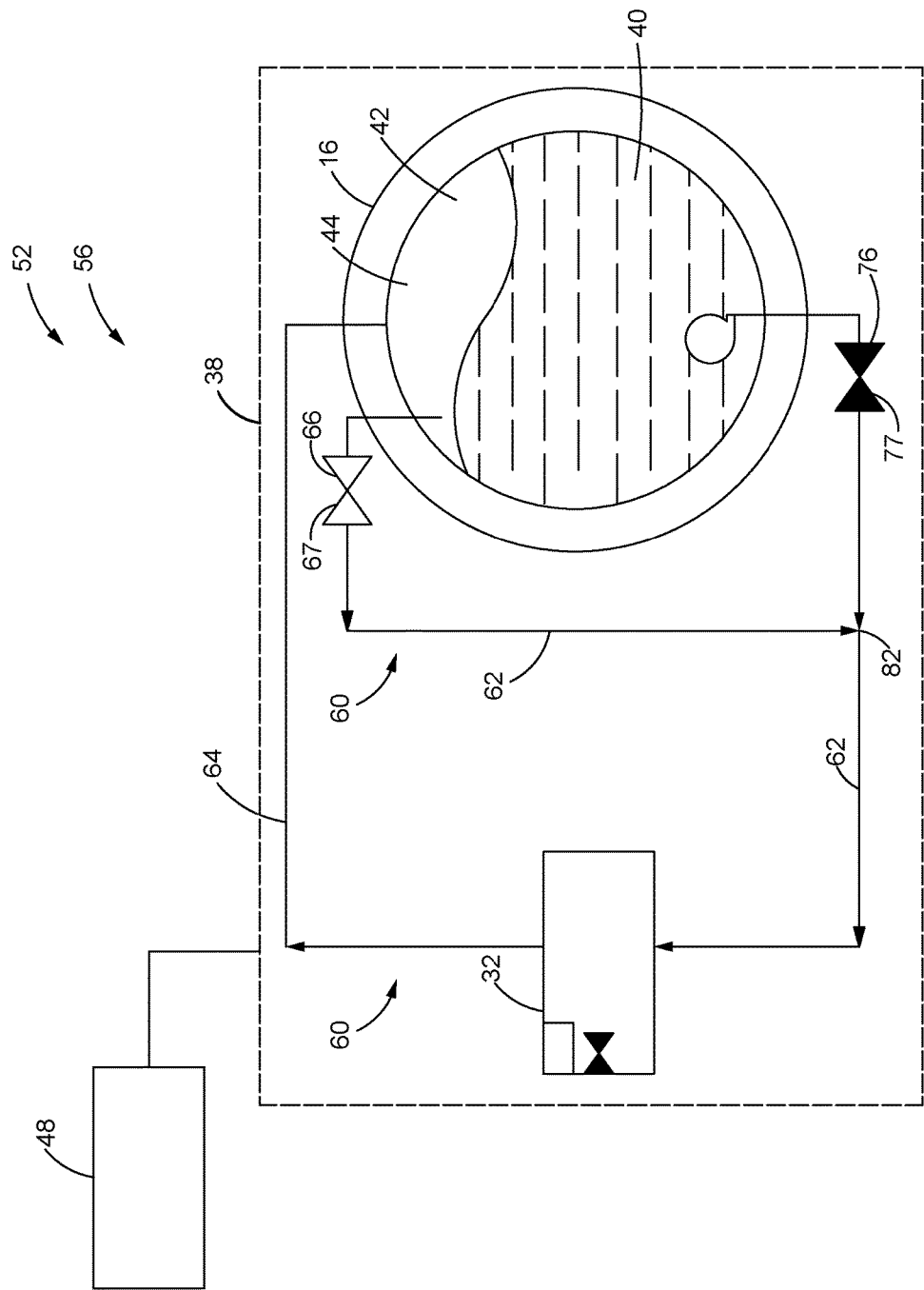
FIG. 3 is a schematic representation of the cooling system in an initial vapor precooling mode, constructed in accordance with the present disclosure.
Figure 4:
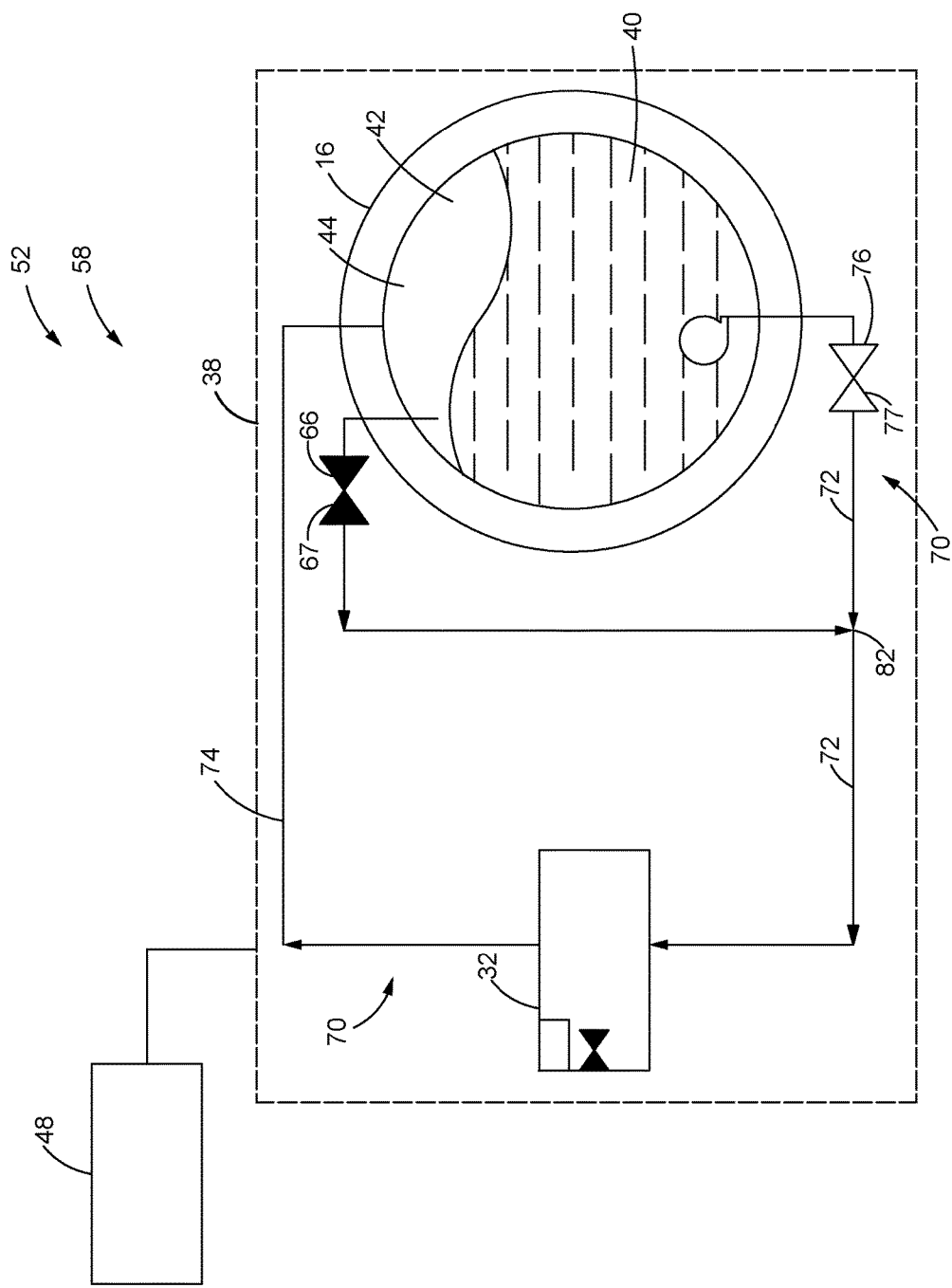
FIG. 4 is a schematic representation of the cooling system in a subsequent liquid precooling mode, constructed in accordance with the present disclosure.

The precooling mode 52 may involve a two-stage cooling process that includes an initial vapor precooling mode 56 (FIG. 3) and a subsequent liquid precooling mode 58 (FIG. 4). In the initial vapor precooling mode 56, the fuel delivery components 32 may be cooled with the vapor 42 from the reservoir 16 to a temperature that approaches the operating temperature. For example, if the fuel is natural gas, then the vapor precooling mode 56 may reduce the temperature of the fuel delivery components 32 to within about 5 to about 100° C. of the boiling point of natural gas (about −165° C.). It will be understood, however, that these temperature ranges are merely exemplary and may vary in practice depending on a number of factors. Once the fuel delivery components 32 are partially cooled with the vapor 42, they may be further cooled to the operating temperature using the liquid 40 from the reservoir 16 in the liquid precooling mode 58.

As shown in FIG. 3, a first fluid circuit 60 of the cooling system 38 may circulate the vapor 42 of the fuel between the fuel delivery components 32 and the reservoir 16 during the vapor precooling mode 56. The first fluid circuit 60 may include a first conduit 62 (e.g., a pipe, etc.) through which the vapor 42 is flowed from the vapor space 44 inside the reservoir 16 to the fuel delivery components 32. The first fluid circuit 60 may further include a return conduit 64 (e.g., a pipe, etc.) through which the vapor 42 is flowed from the fuel delivery components 32 back to the reservoir 16. Positioned in the first fluid circuit 60 may be one or more flow-regulating devices 66, such as one or more valves 67, configured to regulate a flow of the vapor 42 through the first fluid circuit 60. For example, the valve 66 may be positioned in the first conduit 62, as shown. The flow of the vapor 42 from the reservoir 16 into the first fluid circuit 60 may be driven by the vapor pressure in the reservoir 16.

Turning now to FIG. 4, a second fluid circuit 70 of the cooling system 38 may circulate the liquid 40 of the fuel between the fuel delivery components 32 and the reservoir 16 during the liquid precooling mode 58. The second fluid circuit 70 may include a second conduit 72 (e.g., a pipe, etc.) through which the liquid 40 is flowed from the reservoir 16 to the fuel delivery components 32, and a return conduit 74 (e.g., a pipe, etc.) through which the fuel 40 is returned from the fuel delivery components 32 to the reservoir 16. As the liquid 40 may have partially vaporized, there may be two-phase flow (i.e., liquid and vapor) in the return conduit 74. In addition, one or more flow-regulating devices 76, such as one or more vales 77, may be positioned in the second fluid circuit 70 to regulate a flow of the liquid 40 therethrough. For instance, the valve 76 may be positioned in the second conduit 72, as shown. Furthermore, an optional pump 80 may be placed inside of the reservoir 16 to drive the flow of the liquid 40 through the second fluid circuit 70. Alternatively, the vapor pressure in the reservoir 16 may be used to drive the flow of the liquid 40 through the second fluid circuit 70.

It is further noted that the first conduit 62 of the first fluid circuit 60 and the second conduit 72 of the second fluid circuit 70 may be joined at a junction 82 as shown in FIGS. 3-4. The junction 72 may be positioned as far upstream from the fuel delivery components 32 as possible (or as close to the reservoir 16 as possible) to allow the redundancy of as much piping as possible in the first and second fluid circuits 60 and 70. This arrangement permits as much piping as possible to be exposed to the vapor precooling process to reduce vaporization of liquid fuel during the liquid precooling mode 58.

The valve 67 may be open (or otherwise adjusted to allow fluid flow therethrough) and the valve 77 may be closed (or otherwise adjusted to block fluid flow therethrough) during the vapor precooling mode 56 to permit the flow of the vapor 42 through the first fluid circuit 60 (see FIG. 3). In contrast, the valve 67 may be closed (or otherwise adjusted to block allow flow therethrough) and valve 77 may be open (or otherwise adjusted to permit fluid flow therethrough) during the liquid precooling mode 58 to permit the flow of the liquid 40 through the second fluid circuit 70 (see FIG. 4).

Figure 5:
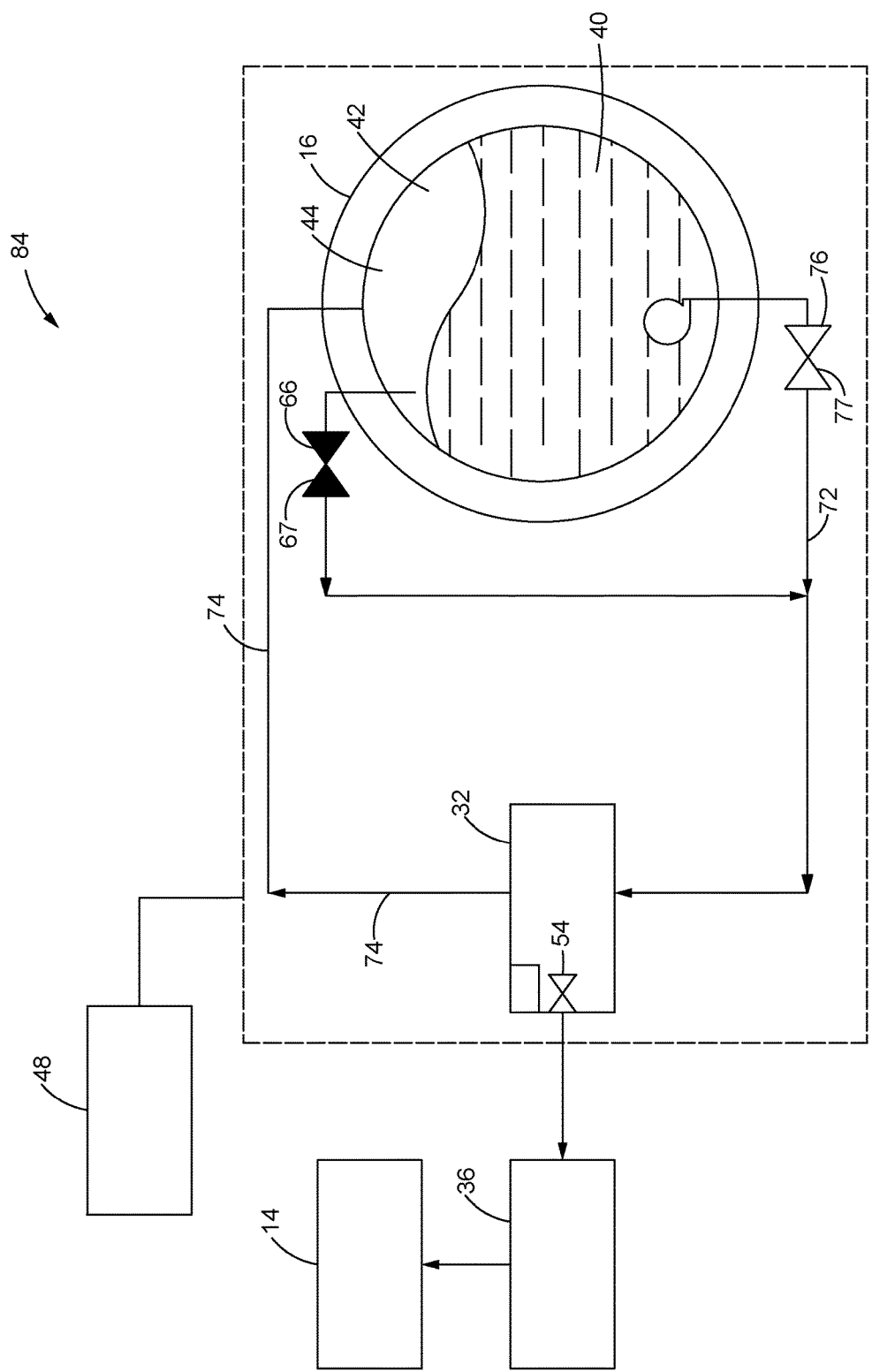
FIG. 5 is a schematic representation of the fuel delivery system in an engine fueling mode following precooling with the cooling system, constructed in accordance with the present disclosure.

When the precooling mode 52 is complete, an engine fueling mode 84 may commence or recommence in which the fuel is delivered to the engine 14 through the cooled fuel delivery components 32 and the downstream fuel delivery components 36 (see FIG. 5). During the engine fueling mode 84, the valve 67 may be closed (or otherwise adjusted to block fluid flow therethrough) and the valve 77 may be open (or otherwise adjusted to allow fluid flow therethrough) to permit the flow of the liquid 40 from the reservoir 16 to the first set of fuel delivery components 32. In addition, the flow-regulating device 54 associated with the first set of fuel delivery components 32 may be adjusted to permit the flow of the fuel to the downstream fuel delivery components 36 and the engine 14. During the engine fueling mode 84, the liquid 40 may flow from the reservoir 16 to the first set of fuel delivery components 32 through the second conduit 72 for eventual delivery to the engine 14. It is also noted that a fraction of the fuel may be returned to the reservoir 16 through the return conduit 74 during the engine fueling mode 84.

INDUSTRIAL APPLICABILITY

In general, the teachings of the present disclosure may find applicability in many industries including, but not limited to, rail transport, construction, agricultural, mining, and marine applications. More specifically, the present disclosure may find applicability in any such industry having machines powered by low boiling point cryogenically-stored fuels.

Figure 6:
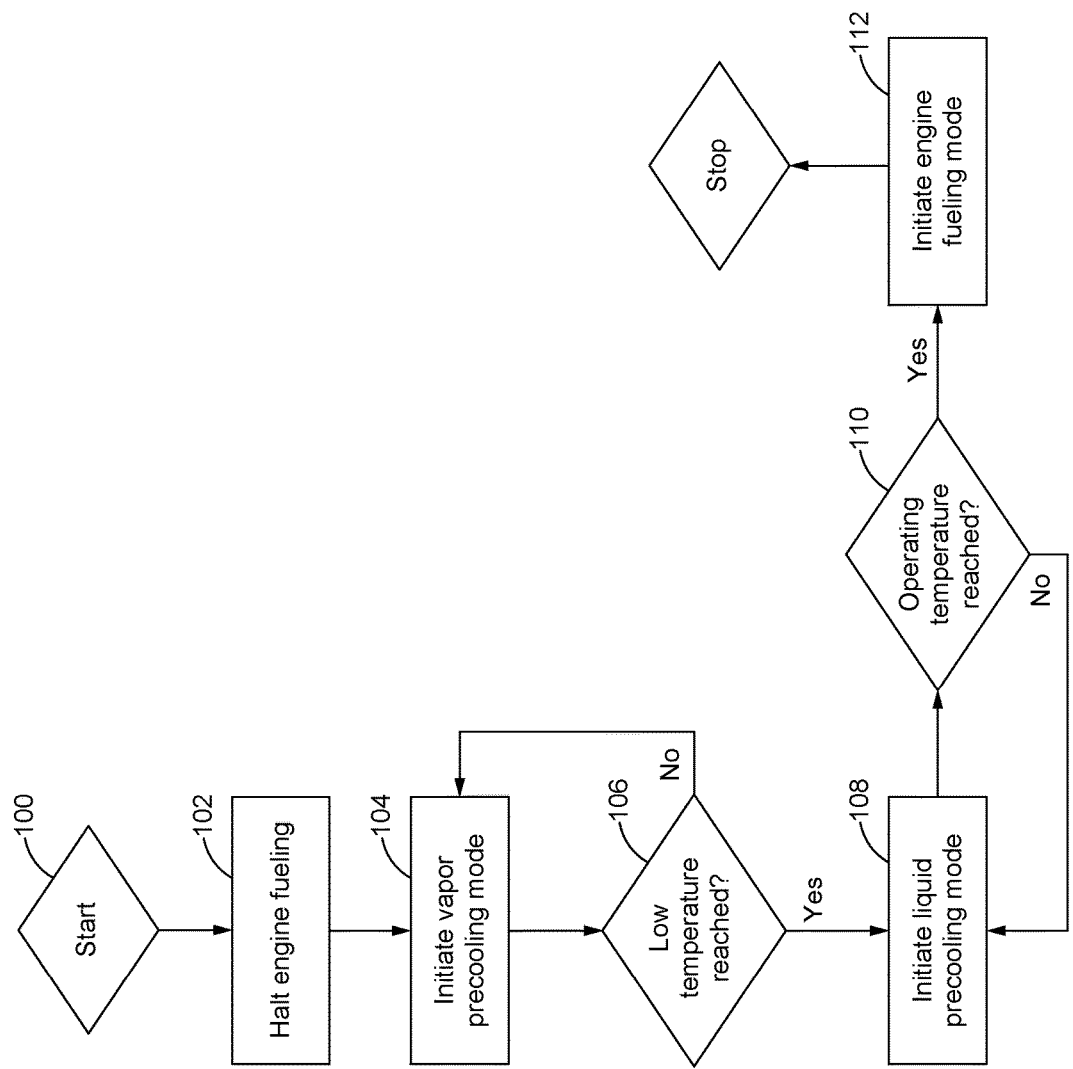
FIG. 6 is a control flow chart depicting a series of steps involved in precooling the fuel delivery components with the cooling system, in accordance with a method of the present disclosure.

Referring now to FIG. 6, a flowchart of steps that may be involved in controlling the cooling system 38 is shown. The precooling mode 52 may start at a block 100 when the ECU 48 receives a signal from the temperature sensor 50 indicating that the temperature of the first set of fuel delivery components 32 is at ambient temperature or otherwise substantially above the desired operating temperature. This may occur, for example, when the machine 10 is initially started from stop after a substantial amount of time. When the precooling mode 52 is initiated, engine fueling may be halted according to a block 102. Specifically, the ECU 48 may send a command to suitably adjust the flow-regulating device(s) 54 associated with the first set of fuel delivery components 32 to prevent the downstream flow of the fuel to the second set of fuel delivery components 36 and the engine 14.

According to a next block 104, the ECU 48 may initiate the vapor precooling mode 56 by sending commands to open the valve 67 and to close the valve 77, thereby allowing the vapor 42 of the fuel to flow through the first fluid circuit 60 and cool the fuel delivery components 32 to a lower temperature (see FIG. 3). The vapor precooling mode 56 may continue until the temperature sensor 50 transmits signals to the ECU 48 indicating that the temperature of the fuel delivery components 32 has reached a predetermined low temperature that approaches the desired operating temperature, or that the rate of change of the temperature of the fuel delivery components 32 has slowed substantially or has become zero (block 106). When this occurs, the ECU 48 may initiate the liquid precooling mode 58 according to a next block 108. The ECU 48 may initiate the liquid precooling mode 58 by sending commands to close the valve 67 associated with the first fluid circuit 60, and to open the valve 77 associated with the second fluid circuit 70, thereby allowing the liquid 40 of the fuel to flow through and further cool the fuel delivery components 32 (see FIG. 4).

The liquid precooling mode 58 may continue until the operating temperature is reached (block 110). When the ECU 48 receives signals from the temperature sensor 50 indicating that the temperature of the fuel delivery components 32 has reached the operating temperature, it may cease the liquid precooling mode 58 and initiate the engine fueling mode 84 according to a block 112. Specifically, the ECU 48 may send commands to adjust the flow-regulating device(s) 54 associated with the fuel delivery components 32 to permit the downstream flow of the fuel to the fuel delivery components 36 and the engine 14 (see FIG. 5).

Figure 7:
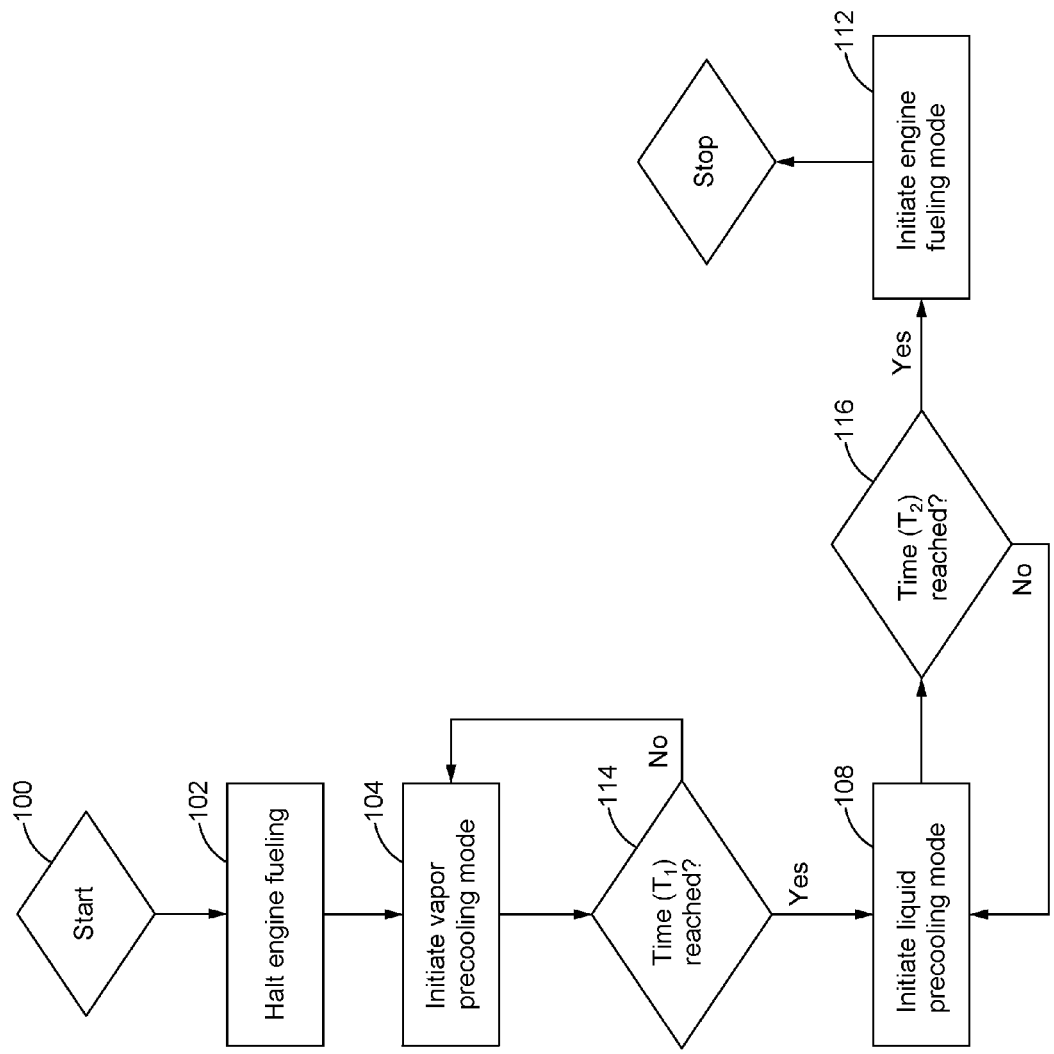
FIG. 7 is a control flow chart similar to FIG. 6 but with the precooling being time controlled, in accordance with another method of the present disclosure.

Alternatively, the precooling mode 52 of the cooling system 38 may be time controlled as shown in FIG. 7. FIG. 7 is identical to FIG. 6 except that the vapor precooling mode 56 may continue until a predetermined time ($T_1$) has been reached (block 114), and the liquid precooling mode 58 may continue until a predetermined time ($T_2$) has been reached (block 116). This arrangement may be applicable if, for example, the specific time intervals to reach a suitable low temperature during the vapor precooling mode 56 and the operating temperature during the liquid precooling mode 58 have been pre-established.

It can be seen from the above that the teachings of the present may find wide industrial applicability in a variety of settings using machines fueled by low boiling point cryogenically-stored fuels. The cooling system disclosed herein uses a two-stage cooling process to precool fuel delivery components to cryogenic operating temperatures with a cryogenically-stored fuel prior to fueling the engine. The two-stage cooling process may be initiated, for example, when the temperature of the fuel delivery components reaches ambient temperature after the machine has been turned off for a substantial period of time. The two-stage cooling process includes an initial vapor precooling stage in which the fuel delivery components are precooled to a temperature approaching the desired cryogenic operating temperature with the vapor of the fuel, followed by a subsequent liquid precooling stage in which the fuel delivery components are further cooled to the desired operating temperature with the fuel in a liquid state. As a large fraction of the heat from the fuel delivery components is transferred to the vapor during the initial vapor precooling stage, the two-stage cooling process advantageously reduces the vaporization of the liquid during the liquid precooling stage. The two-stage cooling process disclosed herein may advantageously avoid potentially harmful two-phase fluid flow effects caused by vaporization of the liquid fuel in the fuel delivery components by reducing the total heat transferred to the liquid fuel. Moreover, it may avoid pressure build-up in the fuel holding reservoir by reducing the amount of vaporized fuel that is returned to the reservoir. It is expected that the technology disclosed herein may find wide industrial applicability in a wide range of areas such as, but not limited to, rail transport, construction, agricultural, mining, industrial power generation, and marine applications.

What is claimed is:

1. A machine, comprising:
   an engine fueled by a low boiling point fuel;
   a reservoir cryogenically storing the low boiling point fuel as both a liquid and a vapor;
   a fuel delivery system configured to deliver the low boiling point fuel from the reservoir to the engine, the fuel delivery system including a first set of fuel delivery components configured to operate at an operating temperature at or below a boiling point of the low boiling point fuel; and
   a cooling system configured to precool the first set of fuel delivery components to the operating temperature in a precooling mode, the precooling mode including an initial vapor precooling mode in which the first set of fuel delivery components are cooled with the vapor from the reservoir, and a subsequent liquid precooling mode following the initial vapor precooling mode and prior to reaching the operating temperature, in which the first set of fuel delivery components are further cooled with the liquid from the reservoir to the operating temperature.

2. The machine of claim 1, wherein the machine is a locomotive.

3. The machine of claim 1, wherein the low boiling point fuel is liquid natural gas.

4. The machine of claim 1, further comprising an electronic control unit in electrical communication with the fuel delivery system and the cooling system, wherein the electronic control unit initiates the precooling mode when a temperature of the fuel delivery components substantially exceeds the operating temperature.

5. The machine of claim 4, wherein the electronic control unit initiates the precooling mode when the temperature of the fuel delivery components is at ambient temperature.

6. The machine of claim 4, wherein, when the liquid precooling mode is complete, the electronic control unit initiates an engine fueling mode in which the liquid from the reservoir is delivered through the cooled fuel delivery components and additional fuel delivery components to the engine.

7. The machine of claim 6, wherein the cooling system includes a first fluid circuit configured to circulate the vapor from the reservoir between the fuel delivery components and the reservoir during the vapor precooling mode, and a first valve configured to regulate a flow of the vapor through the first fluid circuit, and wherein the first valve is open during the vapor precooling mode and closed during the liquid precooling mode.

8. The machine of claim 7, wherein the cooling system further includes a second fluid circuit configured to circulate the liquid from the reservoir between the fuel delivery components and the reservoir during the liquid precooling mode, and a second valve configured to regulate a flow of the liquid through the second fluid circuit, and wherein the second valve is closed during the vapor precooling mode and open during the liquid precooling mode.

9. The machine of claim 8, wherein the first valve is closed and the second valve is open during the engine fueling mode.

10. The machine of claim 8, wherein the first set of fuel delivery components are upstream from a second set of fuel delivery components configured to operate at a temperature above the boiling point of the low boiling point fuel.

11. A cooling system for precooling fuel delivery components of a machine fueled by a low boiling point fuel, the fuel delivery components being configured to operate at an operating temperature at or below a boiling point of the low boiling point fuel, the cooling system comprising:
    a reservoir containing a liquid and a vapor of the low boiling point fuel;

a first fluid circuit configured to circulate the vapor from the reservoir between the fuel delivery components and the reservoir in a vapor precooling mode, the vapor precooling mode reducing a temperature of the fuel delivery components to a temperature approaching the operating temperature; and a second fluid circuit configured to circulate the liquid from the reservoir between the fuel delivery components and the reservoir in a subsequent liquid precooling mode following the vapor precooling mode and prior to reaching the operating temperature, the liquid precooling mode further reducing the temperature of the fuel delivery components to the operating temperature.

12. The cooling system of claim 11, wherein the first fluid circuit includes a first conduit configured to deliver the vapor from the reservoir to the fuel delivery components, and a return conduit configured to return the vapor delivered to the fuel delivery components to the reservoir.

13. The cooling system of claim 12, wherein the second fluid circuit includes a second conduit configured to deliver the liquid from the reservoir to the fuel delivery components, and a return conduit configured to return the liquid delivered to the fuel delivery components to the reservoir.

14. The cooling system of claim 13, wherein the first conduit and the second conduit are joined at a junction.

15. The cooling system of claim 13, wherein the first conduit includes a flow-regulating device to regulate a flow of the vapor to the fuel delivery components, and wherein the second conduit includes a flow-regulating device to regulate a flow of the liquid to the fuel delivery components.

16. The cooling system of claim 15, wherein the flow-regulating of the first conduit is a valve, and wherein the flow-regulating device of the second conduit is a valve.

17. The cooling system of claim 16, wherein the valve of the first conduit is open and the valve of the second conduit is closed during the vapor precooling mode, and wherein the valve of the first conduit is closed and the valve of the second conduit is open during the liquid precooling mode.

18. A method for precooling fuel delivery components of a machine having an engine fueled by a cryogenically-stored fuel, the fuel delivery components being configured to operate at an operating temperature at or below a boiling point of the cryogenically-stored fuel, the method comprising:

in a vapor precooling mode, cooling the fuel delivery components to a temperature approaching the operating temperature with a vapor of the fuel taken from a reservoir cryogenically storing the fuel; and in a liquid precooling mode following the vapor precooling mode, further cooling the fuel delivery components to the operating temperature with a liquid of the fuel taken from the reservoir.

19. The method of claim 18, wherein the vapor is circulated between the reservoir and the fuel delivery components during the vapor precooling mode.

20. The method of claim 19, wherein the liquid is circulated between the reservoir and the fuel delivery components during the liquid precooling mode.

* * * * *